United States Patent [19]
Barecki

[11] 3,897,974
[45] Aug. 5, 1975

[54] CANTILEVERED SEAT FOR MOTORCOACH VEHICLES OR THE LIKE

[75] Inventor: Chester J. Barecki, Grand Rapids, Mich.

[73] Assignee: American Seating Company, Grand Rapids, Mich.

[22] Filed: July 19, 1973

[21] Appl. No.: 380,753

Related U.S. Application Data

[63] Continuation-in-part of Ser. No. 211,423, Dec. 23, 1971, Pat. No. 3,747,979.

[52] U.S. Cl. .................. 297/451; 296/63; 297/232; 297/216; 297/243
[51] Int. Cl. .......................... A47c 7/02; B60n 1/02
[58] Field of Search .............. 297/14, 147, 450–452, 297/445, 216, 232, 240, 349; 5/81; 296/63, 64

[56] References Cited
UNITED STATES PATENTS

| | | | |
|---|---|---|---|
| 3,241,884 | 3/1966 | Thatcher et al. | 297/451 |
| 3,275,283 | 9/1966 | Rauch | 297/349 |
| 3,619,006 | 11/1971 | Barecki | 297/450 |
| 3,625,565 | 12/1971 | Barecki | 297/451 |
| 3,628,829 | 12/1971 | Heilig | 297/217 |
| 3,694,830 | 10/1972 | Koller | 5/81 |
| 3,747,979 | 7/1973 | Barecki | 297/451 |
| 3,762,766 | 10/1973 | Barecki | 297/217 |

*Primary Examiner*—Casmir A. Nunberg
*Attorney, Agent, or Firm*—Price, Heneveld, Huizenga & Cooper

[57] ABSTRACT

A multi-passenger seat is supported by a lower cantilever frame which comprises a horizontal seat frame and an inclined arcuate truss support frame. The horizontal seat frame includes two elongated horizontal stretcher members attached at one end to the wall of a vehicle and at least two cross frame members interconnecting the stretcher members at laterally spaced locations. The inclined arcuate truss support frame is located beneath the horizontal seat frame; and it includes fore and aft inclined arcuate frame members rigidly attached at their upper ends to the stretcher tubes respectively at locations preferably on the aisle side of the transverse center of the horizontal seat frame. The inclined arcuate support frame members extend downwardly from the seat frame and preferably they converge toward each other. They are connected to the wall at locations above the floor of the vehicle. Preferably, the attachment means for attaching the seat to the vehicle wall are adjustable to achieve proper horizontal alignment of the seat. A housing surrounds the inclined arcuate support frame members and the area between the inclined members and the horizontal seat frame to house a heater and air conditioner blower and a radio-announcement speaker.

18 Claims, 13 Drawing Figures

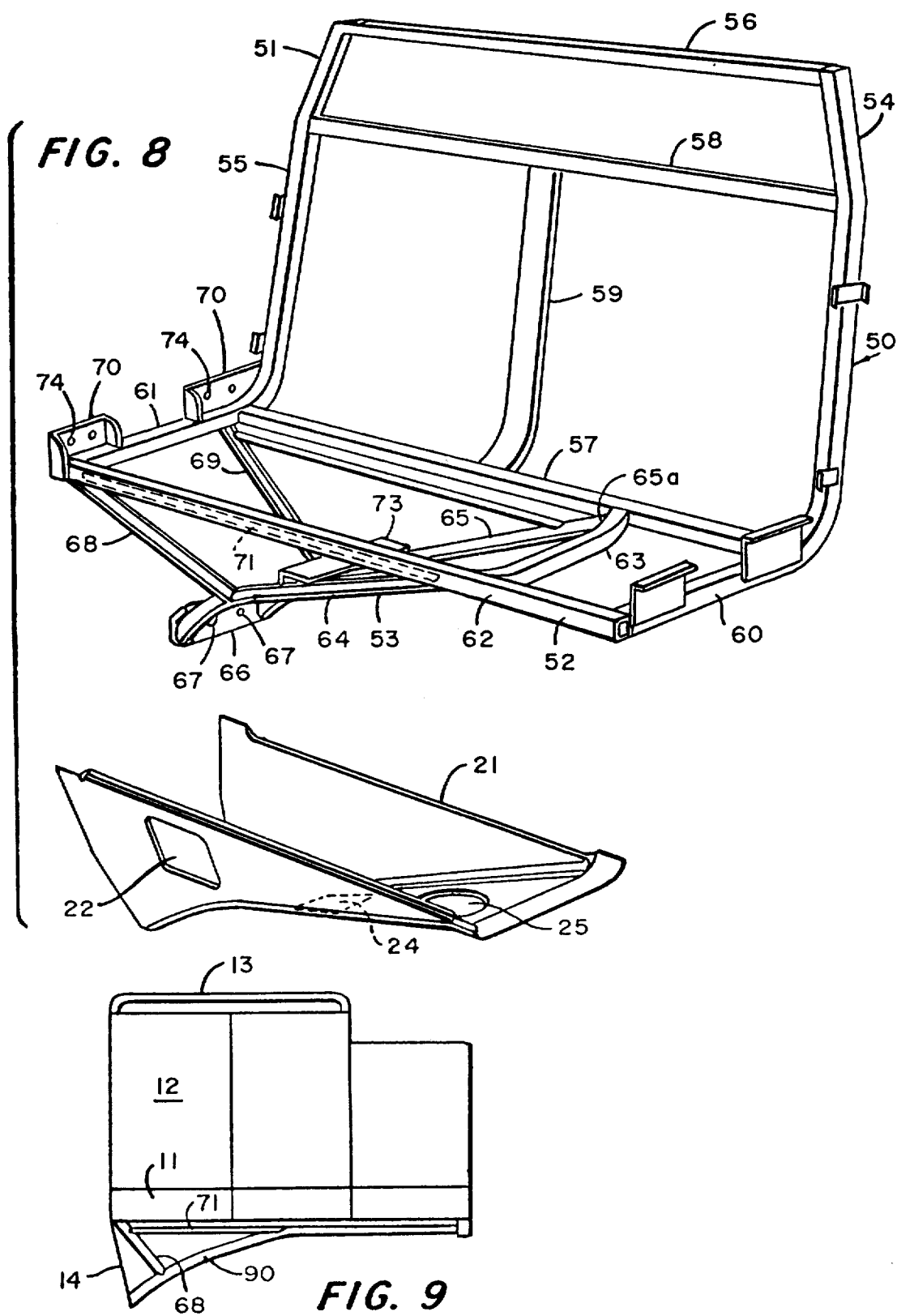

CANTILEVERED SEAT FOR MOTORCOACH VEHICLES OR THE LIKE

CROSS-REFERENCE TO RELATED APPLICATION

This is a continuation-in-part of pending application Ser. No. 211,423, filed in the United States Patent Office on Dec. 23, 1971, and entitled CANTILEVERED SEAT FOR MOTORCOACH VEHICLES AND THE LIKE, now U.S. Pat. No. 3,747,979 the disclosure of which is hereby incorporated by reference.

BACKGROUND OF THE INVENTION

The present invention relates to seating; and more particularly, it relates to structure for cantilevering a multi-passenger seat from the side wall of a motorcoach, train coach or similar transportation vehicle without a supporting connection to the floor. The term "motorcoach seating" is intended to include all types of transportation seating including city service, trains, suburban, and reclining coach seats, characterized in that each seat is intended to hold two persons, one near the wall and one near the aisle of the vehicle.

It has become desirable from the viewpoint of maintenance, to provide seating of the cantilever type, supported entirely from the wall of the vehicle. This type of seat eliminates the usual obstructions connecting the seat to the floor, such as legs, pedestals, or aisle end bases which are usually found supporting the seat at or near the aisle end.

As mentioned, one of the primary advantages of a cantilever-type seat is the ease of cleaning the vehicle with a gang-type sweeper cleaning the entire width of the vehicle in a single sweep, thereby substantially reducing the time and cost of cleaning. There are, however, other advantages to cantilever seats, including a more pleasant and neater appearance, greater facility of ingress and egress by passengers in the seats, elimination of stumbling hazards that legs or bases may contribute to passengers walking down a narrow aisle or exiting from the seat, and ease of retrieving articles from beneath the seats. The latter advantage stems from the fact that an unobstructed view of the floor area is provided, and the available light shines on the unobstructed area. Further, depending upon the seat structure, there may be more room for storage of luggage, etc, beneath a cantilevered seat as well as an increased area for the legs of the passengers located behind the seat.

There are problems, however, in achieving a cantilever seat which has all of the advantages mentioned above yet which is sturdy over the extended period of rugged use expected of a motorcoach seat and which does not become hazardous in the event of a crash. Perhaps the more important of these two considerations is that of safety. In the event of a crash, the seat structure and its attachment to the vehicle wall must be such that the seat does not become detached from the wall either upon crash impact or upon being impacted by a passenger, for example, from the seat behind. If a seat does become detached from the wall, it adds additional energy and momentum to break loose adjacent seats which, in turn, if broken loose, still further increase the danger to passengers. Adjacent seats which are rigidly mounted so as to remain in place in the event of a crash become, in effect, safety barriers to define a critical zone or compartment in which a passenger is restrained from adding to crash momentum and, at the same time, which protects a passenger against the danger of flying objects.

SUMMARY OF THE INVENTION

The present invention achieves all of the advantages of a cantilever seat while achieving substantial crash integrity. That is, in the event of a crash, seats constructed according to the present invention are flexible enough not to impart a substantial amount of energy to an occupant in the case of a crash or to come detached if struck by a passenger but they also act to provide a compartment to hold a passenger in a safety zone, protected against flying objects and against gathering impact momentum himself.

Seating constructed according to the present invention comprises a lower cantilever frame including a horizontal seat frame and an inclined arcuate truss support frame. The seat frame has two elongated stretcher members attached at one end to the wall of a vehicle and extending outwardly thereof. Preferably, at least two cross frame members interconnect the stretcher members at laterally spaced locations. The truss frame is located beneath the seat frame and it acts as a truss not only to hold the seat frame in its horizontal position, but also to enhance its resistance to twisting relative to the wall in the event that it is struck by a loose object in a crash.

The truss frame includes fore and aft inclined arcuate frame members rigidly attached at their upper ends to the stretcher members respectively at locations preferably toward the aisle side of the transverse center of the seat frame. The inclined arcuate truss frame members extend and curve downwardly from the seat frame, and preferably they converge toward each other. They are connected to the wall at spaced locations above the floor of a vehicle.

Preferably, the attachment means for attaching the seat to the vehicle wall are adjustable to achieve proper horizontal adjustment of the seat.

A stress analysis of a contilever frame constructed according to the present invention indicates that it is a substantial improvement, from a safety standpoint, from certain two-passenger seats which have been suggested in the past. Bending in the horizontal seat frame members is minimized by attaching the upper ends of the inclined arcuate support frame members toward the aisle end of the transverse center of the seat. Further, twisting about a vertical axis (that is, away from the wall) is minimized because of the truss effect produced by the inclined arcuate support frame members. It has been found that each member of the structure contributes to bearing the load and resisting bending or twisting, thereby yielding a safer and more durable structure and providing one which has a high degree of crash integrity.

In a further aspect of the present invention, a housing surrounds the inclined arcuate truss frame members and the area between these members and the horizontal seat frame to house a heater and air conditioner blower and an audio radio-announcement speaker. Preferably, the housing is made of plastic, fiberglass, sheet metal or the like and the lower end conforms to the curvature of the arcuate truss frame members.

Other features and advantages of the present invention will be apparent to persons skilled in the art from the following detailed description of preferred embodiments accompanied by the attached drawing wherein

BRIEF DESCRIPTION OF THE DRAWINGS

FIG. 8 is a front perspective view taken from the aisle of the frame of the seat of FIG. 1, with the inclined arcuate truss frame housing exploded below;

FIG. 9 is a schematic front elevational view of a three-passenger seat constructed according to the present invention;

DESCRIPTION OF THE PREFERRED EMBODIMENTS

Figure 1:
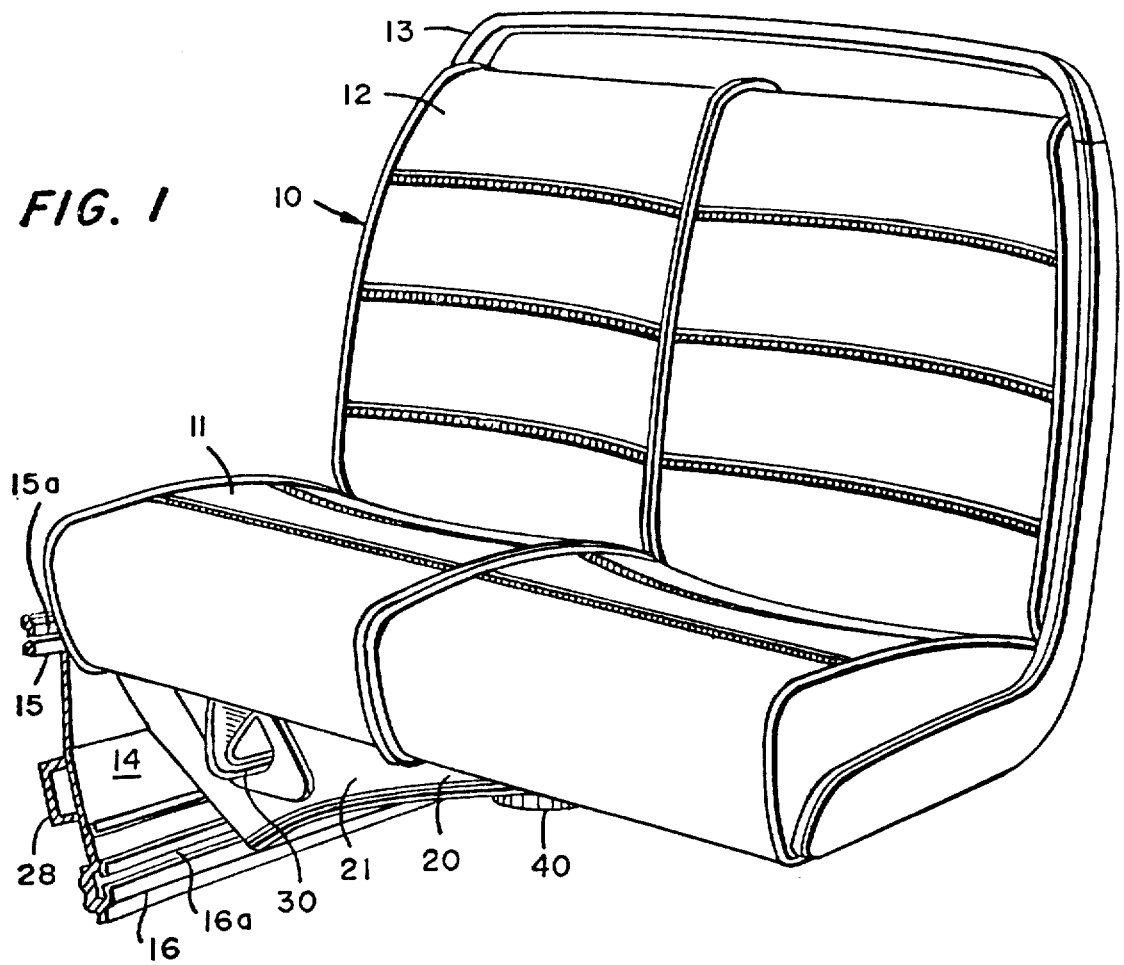
FIG. 1 is a front perspective view taken from the aisle of a two-passenger seat constructed according to the present invention and attached to a wall section shown in fragmentary form.
Figure 2:
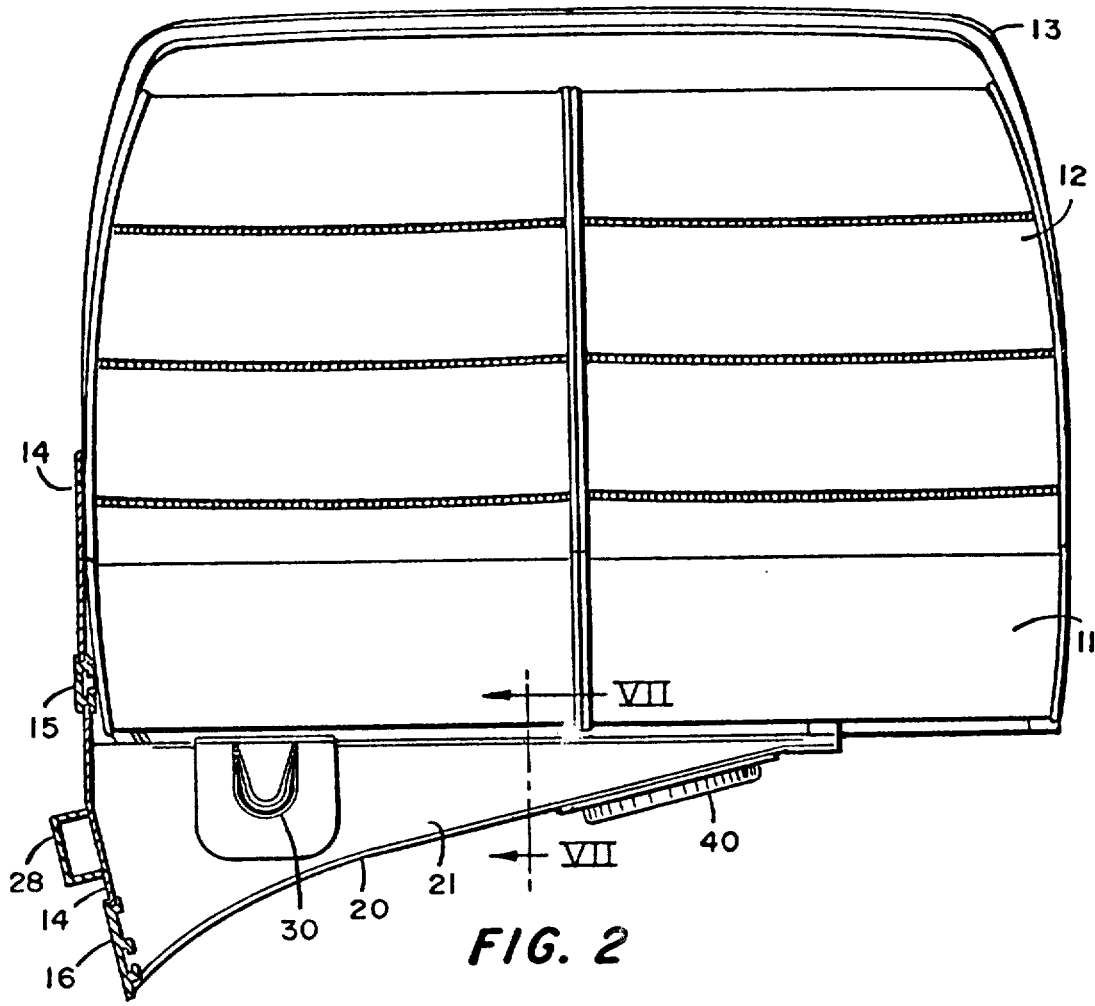
FIG. 2 is front elevational view of the seat shown in FIG. 1.
Figure 3:
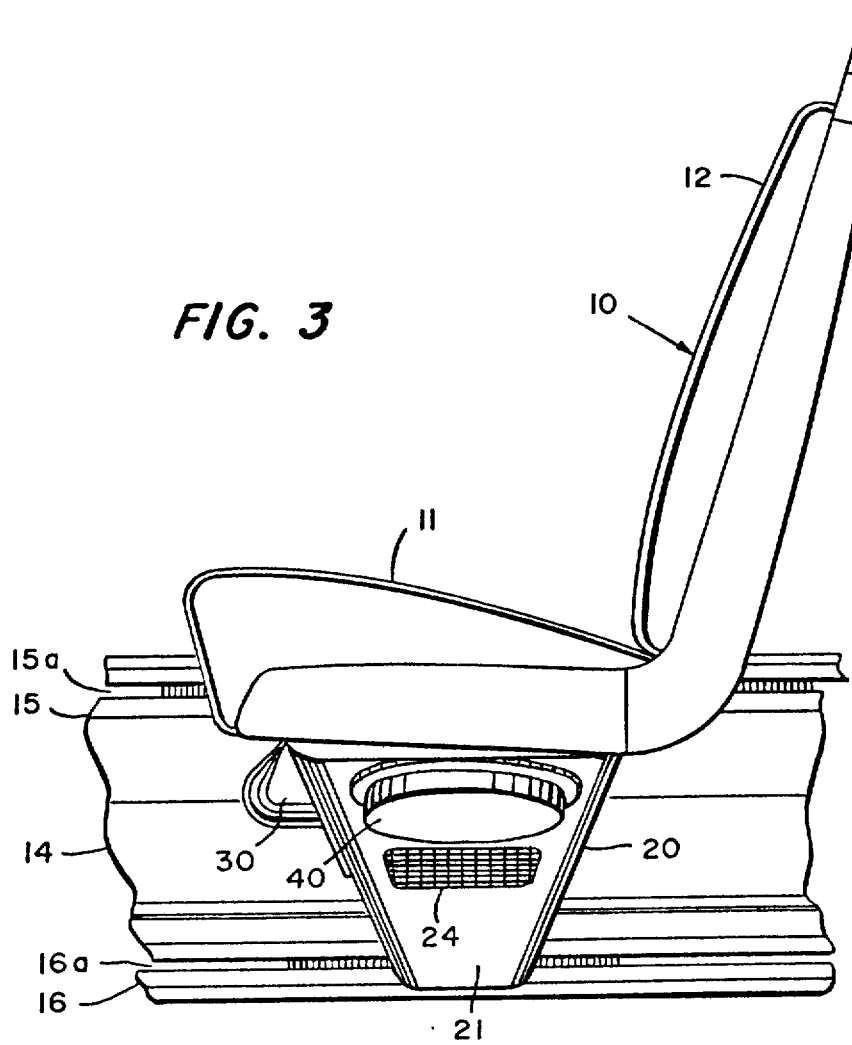
FIG. 3 is an aisle end elevational view of the seat of FIG. 1.

Referring to the drawings in more detail, FIGS. 1–3 are, respectively, an aisle front perspective view, a front elevational view and an aisle side elevational view of an upholstered cushioned two-passenger cantilever seat 10 constructed according to the present invention. As shown, seat 10 includes a seat portion 11 and a back portion 12. A grab rail 13 is provided along the top of back portion 12. Although seat 10 is shown as cushioned and upholstered, it will be obvious that the upholstered cushions can be replaced with more durable economical finishing materials such as plastic or fiberglass seat shells or vinyl-coated sheet metal and the like.

Seat 10 is supported by means of a lower cantilever frame 20 which is enclosed by a housing 21 to house a heater-air conditioner blower behind blower cover 30 with an air outlet 24 and an audio radio-announcement speaker 40 for broadcasting music, street announcements, tour programs and the like. Seat 10 is attached to the vehicle wall 14 by attachment means including an upper track 15 and a lower track 16. It will be observed that the aisle side of seat 10 is free of attachment and that there is no attachment to the floor of the vehicle beneath seat 10.

Figure 5:
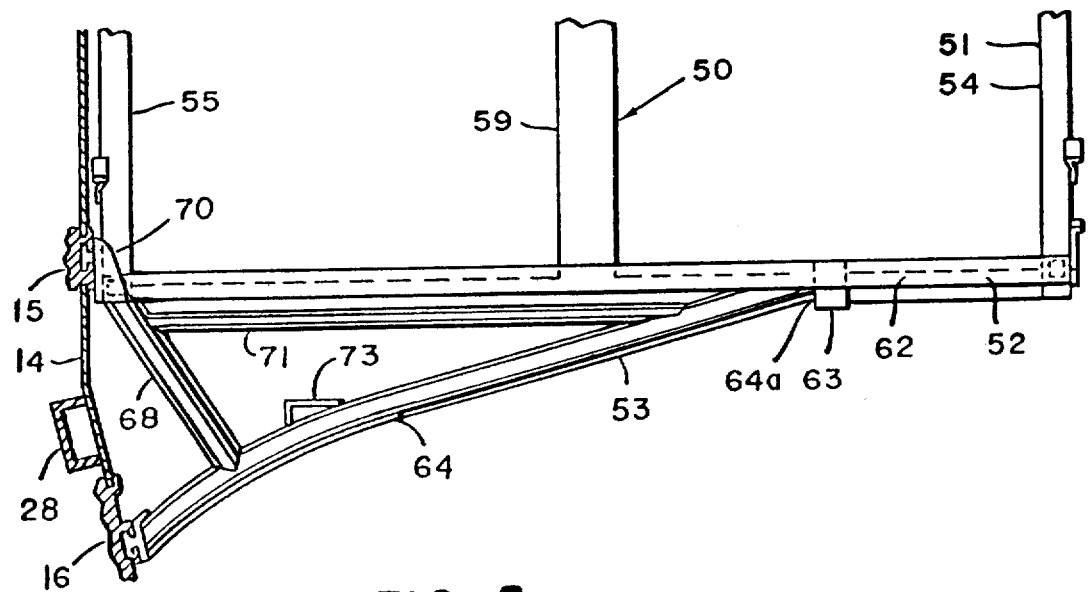
FIG. 5 is a front elevational view of the lower frame of the seat of FIG. 1.

The structural frame 50 of seat 10 is most clearly shown in FIGS. 5 and 8, housing 21 being shown exploded below frame 50 in FIG. 8. Structural frame 50 includes a generally vertical back portion 51, a generally horizontal seat portion 52, and a cantilever frame portion 53. For maximum strength and rigidity, the frame components are preferably tubular steel, although other structural members may be utilized.

The back frame portion 51 includes cross frame means aisle side rail 54, and wall side rail 55, and horizontal top stretcher member 56 at the top of back portion 51, bottom horizontal stretcher 57 at the base of back portion 51, and intermediate horizontal stretcher 58 between top stretcher 56 and bottom stretcher 57. A central vertical cross member 59 connects stretcher members 57 and 58 at approximately their midpoints to provide more rigid structural integrity to back portion 51.

Seat portion 52 includes cross frame means aisle side rail 60 and wall side rail 61, and horizontal stretcher members 62 at the front and 57 at the rear of seat portion 52. A cross member 63 connects stretcher members 57 and 62 at the aisle side of their midpoints to add structural rigidity to the seat portion 52.

Cantilever frame 53 includes an inclined arcuate truss frame having two inclined arcuate frame members 64 and 65 welded or otherwise connected at their upper ends to cross member 63 adjacent the two horizontal stretcher members 57 and 62 of seat frame 52 at 64a and 65a, respectively. Inclined arcuate frame members 64 and 65 curve downwardly and preferably converge toward each other in the direction of the wall (FIG. 6) where the lower end of each is connected to a horizontal mounting bar or strap 66. The curving or upward bowing and the convergence of inclined members 64 and 65 allows a maximum of leg and foot room for the passengers sitting in seat 10 as well as in the seat behind it. Bar 66 has bolt holes 67 therein for attaching bar 66 to lower attachment track 16 at the lower portion of the vehicle wall. Alternatively, bar 66 can be made as two pads at the end of each of the inclined members 64 and 65. Brace struts 68 and 69 are welded or otherwise connected between inclined arcuate members 64 and 65, respectively, and wall side rail 61 to absorb some of the stress on inclined members 64 and 65. Preferably, struts 68 and 69 are connected to inclined arcuate members 64 and 65 at the point of maximum curvature thereof.

The upper ends of inclined arcuate members 64 and 65 are connected to cross member 63 at 64a and 65a, respectively, beyond the midpoint of horizontal stretcher members 62 and 57 toward the aisle. The exact location of these connections may be varied depending on the load requirements of the seat. As the connection is made nearer the wall, less obstruction from the inclined arcuate truss frame of cantilever frame 53 results, thereby achieving greater leg room and easier access under the seat for cleaning, etc. However, as the connection is located nearer the aisle, greater support strength is achieved. It has generally been found that in two-passenger seats, the optimum location for the connection of the upper ends of the inclined arcuate members of the truss frame is at least at the midpoint and preferably on the aisle side of the midpoint of the horizontal seat frame stretcher members.

Figures 6, 7:
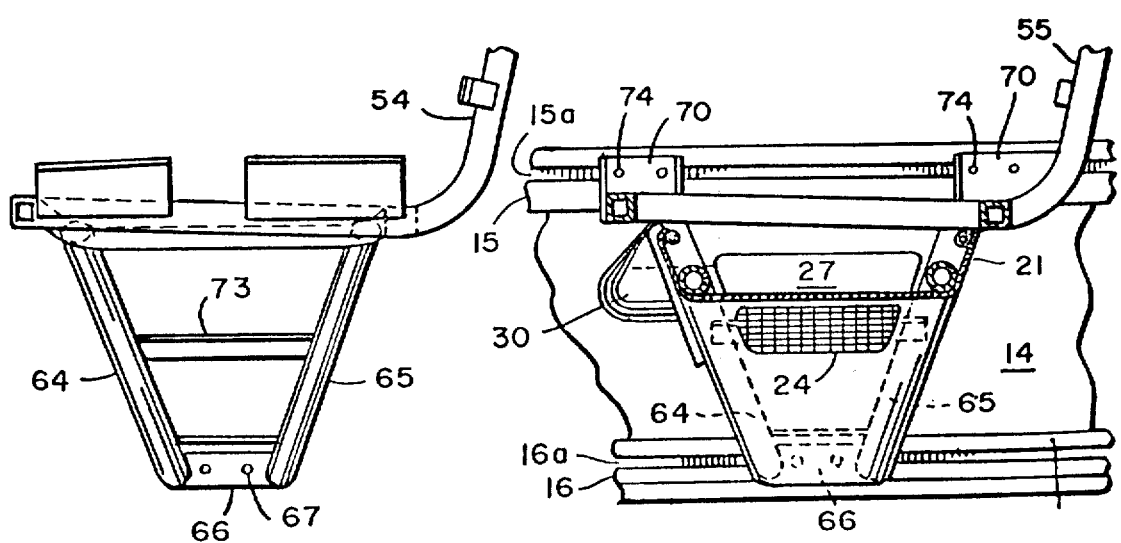
FIG. 6 is an aisle end elevational view of the lower frame of the seat of FIG. 1.
FIG. 7 is a cross-sectional side view of the lower frame and truss frame housing of the seat of FIG. 1, taken along the plane VII—VII of FIG. 2.

A pair of wall mounting brackets 70 with mounting holes 74 are provided on the seat side rail member 61 for mounting seat 10 to upper attachment track 15 on the wall of the vehicle (FIGS. 7 and 8). Further, cantilever frame 53 includes housing mounting members 71 and 72 which extend horizontally between strut 68 and inclined member 64, and strut 69 and inclined member 65, respectively, for attaching housing 21 around cantilever frame 53 beneath seat frame 52. Cantilever frame 53 also includes a blower mounting bracket 73 extending between inclined arcuate frame members 64 and 65 for mounting the heater-air conditioner blower motor within housing 21.

Housing 21 is designed to surround cantilever frame 53 beneath seat frame 52 with the lower portion thereof conforming to the curvature of the inclined arcuate truss frame members 64 and 65. On the front of housing 21, an opening 22 is provided for access to the blower motor and mechanism 23, which is covered by blower cover 30. An air outlet opening 24 and a speaker-receiving opening 25 are provided on the underside wall of housing 21.

Figure 4:
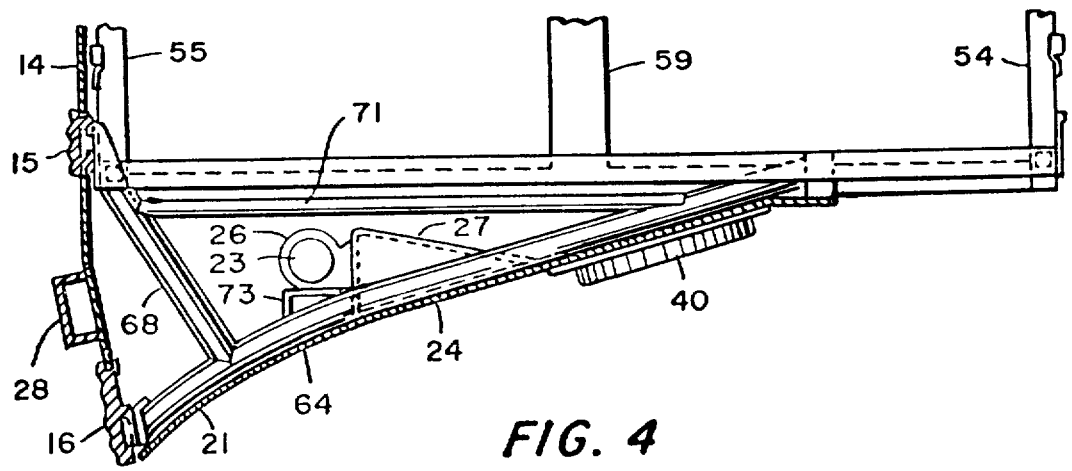
FIG. 4 is a front cross-sectional view of the inclined arcuate truss frame and housing of the seat of FIG. 1.

Referring to FIG. 4, the blower motor 23 is mounted on mounting bracket 73 within blower housing 26 which is in communication with air duct 27 which leads to air outlet 24. Air duct 27 is provided to directionalize the air flow from blower 23 and to prevent heated air from coming into contact with speaker 40. Although heating coils can be provided within blower housing 26, it is preferred to provide heated or air conditioned air to blower 26 from a remote heating and air conditioning source in the vehicle via duct work in the vehicle walls such as, for example, air duct 28.

The means for attaching seat 10 to attachment tracks 15 and 16 on vehicle wall 14 are most clearly shown in FIGS. 10–13. Although conventional bolts can be utilized to make the attachment through holes 74 in brackets 70 and holes 67 in bar 66, it is preferred that the attachment means be adjustable to permit horizontal adjustment of seat 10 when it is being mounted. Accordingly, it is preferred that an adjustable attachment means 80 be utilized. Attachment means 80 consists of a rectangular plate slide 81 which slides along the inside groove of the attachment track 15 or 16. Plate slide 81 has a width smaller and a length greater than the channel openings 15a and 16a in tracks 15 and 16 so that it can be inserted with the width thereof parallel to openings 15a and 16a and then rotated 90° to secure it in the tracks. An internally threaded barrel projection 82 extends out of plate slide 81 and threadably receives an externally threaded shoulder bolt 83 which includes a stepped-down diameter externally threaded portion 84, the end of which includes a square head 85 to permit adjustment with a socket wrench or the like. A nut 86 is used to secure attachment bracket 70 or bar 66 to the attachment means 80.

Figure 10:
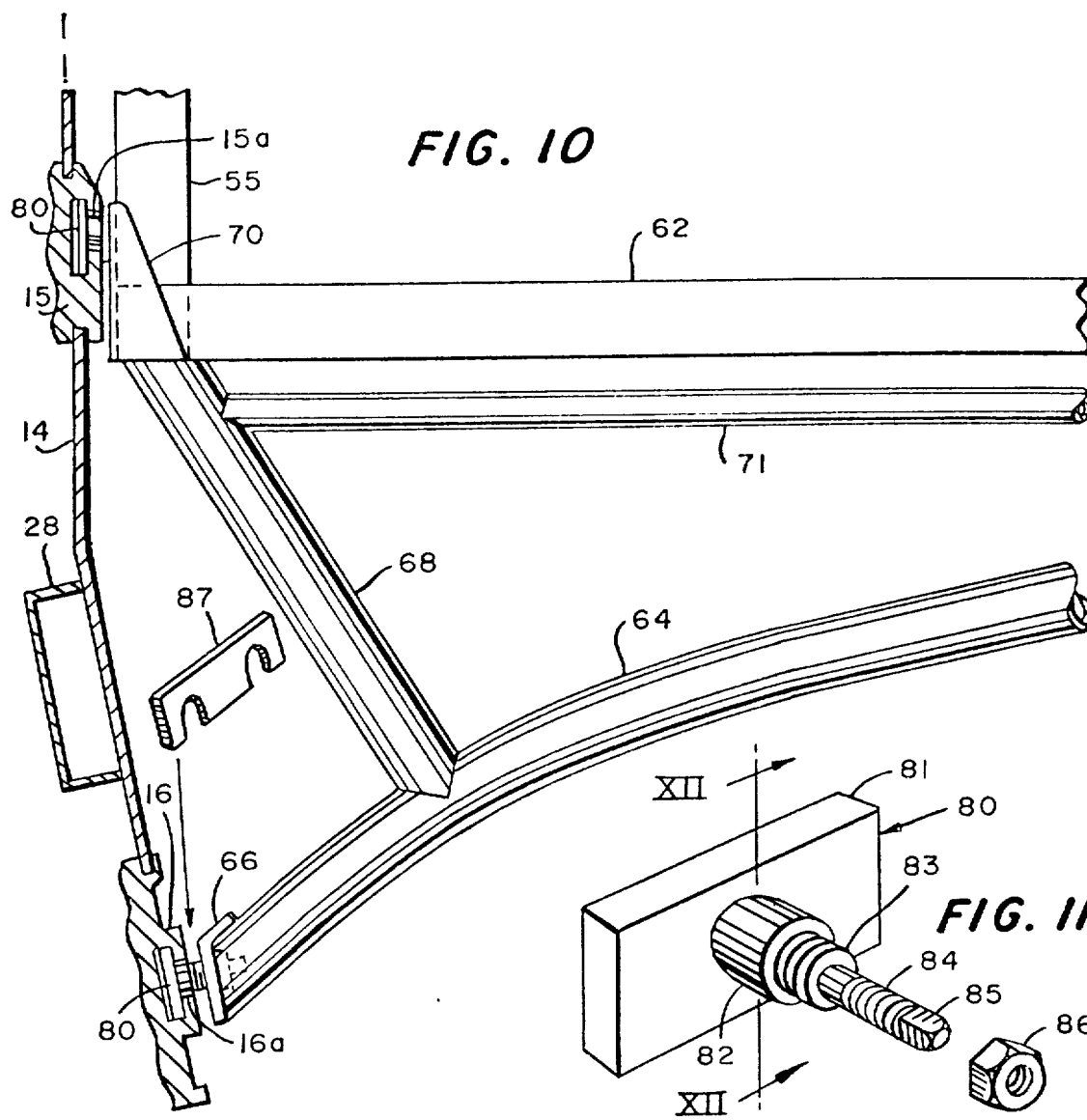
FIG. 10 is a fragmentary front elevational view of the truss frame and wall attachment means of the seat of FIG. 1.
Figure 11:
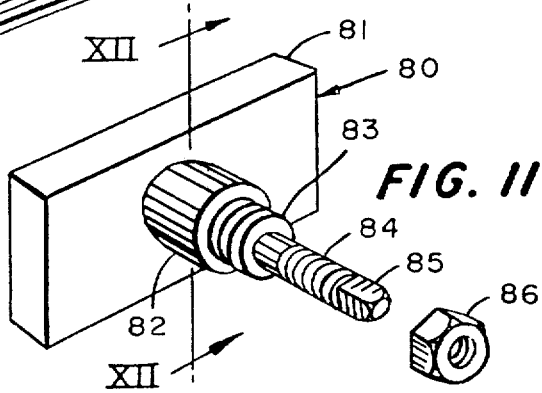
FIG. 11 is a view of a wall attachment means for seats constructed according to the present invention.
Figure 12:
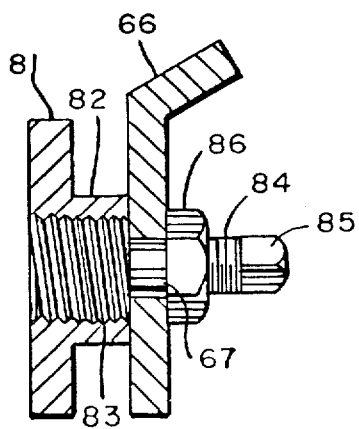
FIG. 12 is a side cross-sectional view of the wall attachment means of FIG. 11, taken along the plane XII—XII of FIG. 11.
Figure 13:
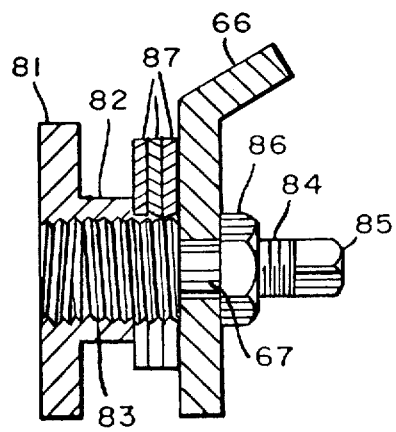
FIG. 13 is a side cross-sectional view similar to FIG. 12 only with the wall attachment means in an extended position.

In mounting seat 10 to the vehicle wall, the requisite number of attachment means 80 are secured in attachment tracks 15 and 16 by inserting plate slides 81 into the track channels by aligning the width thereof with the channel track opening and then rotating the plate slides 81 90° so that the plate slides 81 cannot be pulled out of the track channels. Seat 10 is then lifted into position and the threaded portions 84 of the shoulder bolts 83 of the attachment means 80 are passed through holes 67 in bar 66 and holes 74 in mounting brackets 70. The nuts 86 are then threaded onto the threaded portion 84 of the bolts 83 and tightened to secure the mounting of seat 10. One of such completed attachments is shown in FIG. 12. The horizontal alignment of seat 10 is then checked. If seat 10 is sloping downwardly toward the aisle, outward adjustments of the attachment means 80 in lower track 16 are made by loosening nuts 86 and unscrewing shoulder bolts 83 from barrel projections 82 until seat 10 is raised to proper horizontal alignment. The nuts 86 are then tightened. To avoid any chance of rattles in the attachment means and to rigidify the attachment in the adjusted position, it is preferred that shims 87 be inserted between the seat mounting bracket, e.g., bar 66, and barrel projections 82 to fill the space therebetween prior to making the final tightening adjustment of nuts 86, as shown in FIGS. 10 and 13.

In the event that horizontal seat 10 is out of horizontal alignment because of being inclined upwardly toward the aisle, an outward adjustment of the attachment means 80 in upper track 15 is made in the same fashion as discussed above. As will be appreciated, the attachment means 80 can be readjusted after the seat has been in use in the event it has been jarred out of alignment.

Referring now to FIG. 9, a schematic front elevation view of a three-passenger seat is shown. The construction of such a three-passenger seat is similar to the construction of the two-passenger seat shown in FIG. 1, except that the inclined arcuate truss frame members 64 and 65 of seat 10 of FIG. 1 have been replaced with longer inclined arcuate truss frame members 90, the aisle ends of which extend beneath the third seating position adjacent the aisle. The additional length of inclined arcuate truss frame members 90 provides the additional requisite support for the load of the third seating position adjacent the aisle. Depending upon the strength of the structural frame components, in the case of a three-passenger seat, it may be preferred to employ one or more diagonal struts across portions of the back frame to relieve some of the stress on the aisle ends of inclined arcuate truss frame members 90. The use of such back diagonal struts is disclosed in my co-pending, coassigned application filed on even date herewith entitled CANTILEVERED SEAT FOR MOTOR-COACH VEHICLES OR THE LIKE.

While preferred embodiments of the invention have been described and illustrated, it will be obvious to those skilled in the art that various changes and modifications can be made without departing from the spirit of the present invention. Accordingly, the scope of the present invention is deemed to be limited only by the appended claims.

The embodiments of the invention in which an exclusive property or privilege is claimed are defined as follows:

1. In a multi-passenger seat for a vehicle, the combination comprising: a horizontal seat frame having two elongated horizontal stretcher members and cross frame means interconnecting said stretcher members at laterally spaced locations to form a rigid structure; an inclined arcuate truss frame located beneath said horizontal stretcher members and including forward and rear inclined arcuate truss frame members rigidly attached at their upper ends adjacent said stretcher members respectively and inclined downwardly from said attachments the curvature of said truss frame members being upwardly toward said horizontal seat frame thereby providing by said arcuate shape less underseat obstruction from the inclined truss member and a resultant greater leg and foot room; and means for mounting the wall ends of said stretcher members and the lower ends of said inclined arcuate truss frame members to the wall of said vehicle at a location above the floor, said seat being characterized in there being no connection between said seat and the floor of the vehicle.

2. The combination of claim 1 further comprising first and second wall mounted track members connected respectively to the wall ends of said horizontal stretcher members and extending respectively forwardly and rearwardly of the forward and rear stretcher members, each track member including means providing grooves adapted to receive attachment means for securing said seat to said wall of said vehicle.

3. The combination of claim 1 which further comprises a housing surrounding said inclined arcuate truss frame members and the area between said truss frame members and said horizontal seat frame.

4. The combination of claim 3 wherein said housing houses a heater-air conditioner blower motor.

5. The combination of claim 4 wherein said housing further houses an audio speaker.

6. The combination according to claim 3 wherein the lower portion of said housing conforms to the contour of said inclined arcuate truss frame members.

7. The seat of claim 1 in which brace members are connected to each of said arcuate truss frame members intermediate the ends thereof; said brace members extending from said truss frame members to said horizontal seat frame and being connected thereto.

8. The combination according to claim 1 wherein said means for mounting the wall ends of said stretcher members and the lower ends of said inclined arcuate truss frame members to the wall of said vehicle are adjustable.

9. The combination according to claim 8 wherein each of said adjustable mounting means includes an attachment means comprising a first portion adapted to be attached to said wall and having an internally threaded barrel projection extending away from said wall; an externally threaded shoulder bolt threadably received within said internally threaded barrel projection, said shoulder bolt including a stepped-down diameter externally threaded portion being adapted to be received within a mounting hole on the wall side of said seat and rigidly connected through said hole by said nut means.

10. A combination according to claim 9 further comprising first and second track members connected respectively to the wall of said vehicle each of said track members being adapted to receive and retain said first portion of at least one of said attachment means.

11. The combination of claim 10 wherein each of said track members includes an internal groove in communication with a channel opening; and wherein said first portion of said attachment means is a generally rectangular plate having a width less than the width of said channel opening and a length greater than the width of said channel opening whereby said first portion can be secured within said track groove by aligning the width of said first portion with the width of said channel opening so that said first portion can be passed into said groove and thereafter rotating said first portion 90° to prevent said first portion from being withdrawn out of said track groove.

12. A cantilever frame for a vehicle comprising a horizontal seat frame including two elongated stretcher members and at least two cross frame members interconnecting said stretcher members at locations adjacent the aisle and wall ends thereof to form a rigid structure; an inclined arcuate truss frame including first and second arcuate truss frame members rigidly connected at their upper ends adjacent said stretcher members of said horizontal frame at locations toward the aisle end of the transverse center thereof and being inclined and curved downwardly from their respective attachments adjacent said horizontal stretcher members; and mounting means connected with the lower, wall ends of said truss frame members and providing attachment means holes for securing the same to said wall; and first and second bracket means connected respectively to the wall ends of said stretcher members and providing attachment means holes for securing the same to said wall.

13. The combination of claim 12 further comprising first and second wall mounted track members connected respectively to the wall ends of said horizontal stretcher members and extending respectively fowardly and rearwardly of the forward and rear stretcher members, each track member including means providing grooves adapted to receive attachment means for securing said seat to said wall of said vehicle.

14. The combination of claim 12 wherein said inclined arcuate truss frame members are connected to associated stretcher members at locations toward the aisle side of the transverse center thereof to enhance resistance of said seat frame to bending and to twisting about a vertical axis.

15. The combination according to claim 12 wherein said means for mounting the wall ends of said stretcher members and the lower ends of said inclined arcuate truss frame members to the wall of said vehicle are adjustable.

16. The combination according to claim 15 wherein each of said adjustable mounting means includes an attachment means comprising a first portion adapted to be attached to said wall and having an internally threaded barrel projection extending away from said wall; an externally threaded shoulder bolt threadably received within said internally threaded barrel projection, said shoulder bolt including a stepped-down diameter externally threaded portion being adapted to be received within a mounting hole on the wall side of said seat and rigidly connected through said hole by said nut means.

17. A combination according to claim 16 further comprising first and second track members connected respectively to the wall of said vehicle each of said track members being adapted to receive and retain said first portion of at least one of said attachment means.

18. The combination of claim 17 wherein each of said track members includes an internal groove in communication with a channel opening; and wherein said first portion of said attachment means is a generally rectangular plate having a width less than the width of said channel opening and a length greater than the width of said channel opening whereby said first portion can be secured within said track groove by aligning the width of said first portion with the width of said channel opening so that said first portion can be passed into said groove, and thereafter rotating said first portion 90° to prevent said first portion from being withdrawn out of said track groove.

* * * * *